J. TINGLEY.
Drop-Valve Boxes for Pumps.
No. 152,259.          Patented June 23, 1874.
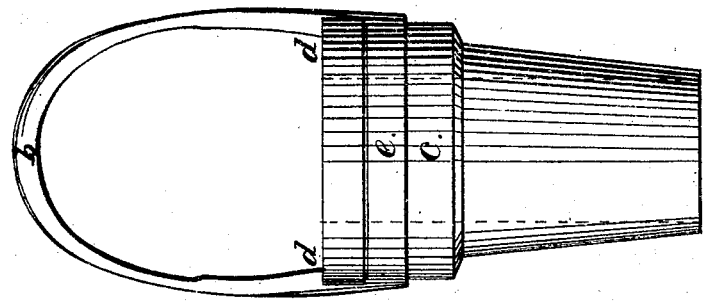
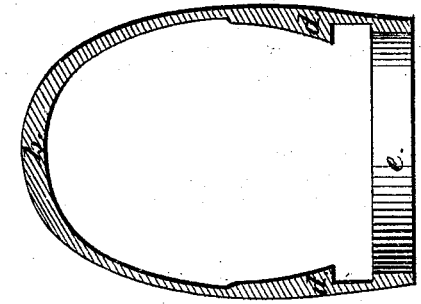
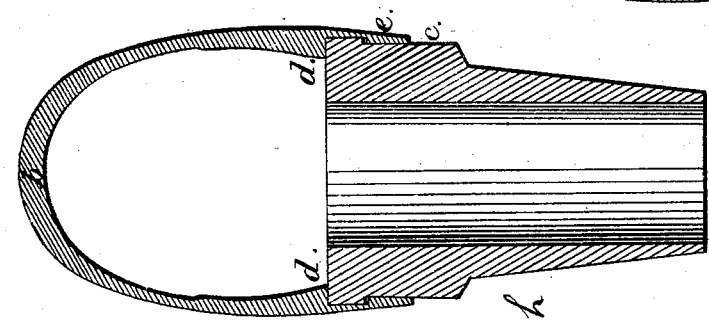
Witnesses          Inventor
John Tingley

UNITED STATES PATENT OFFICE.

JOHN TINGLEY, OF PHILADELPHIA, PENNSYLVANIA.

IMPROVEMENT IN DROP-VALVE BOXES FOR PUMPS.

Specification forming part of Letters Patent No. 152,259, dated June 23, 1874; application filed October 3, 1873.

*To all whom it may concern:*

Be it known that I, JOHN TINGLEY, of the city of Philadelphia, in the State of Pennsylvania, have invented a new and Improved form of Drop-Valve Box for Pumps; and I do hereby declare that the following is a full and exact description of the same.

My invention consists of a malleable-iron bail and band in combination, cast of such shape as to admit a circular wooden valve-box to pass in and be driven tight within the band, and further secured by catches on the inside of the bail, thus removing the great defect of splitting, and at the same time reducing the cost of manufacture less. The lower portion of the tubular box being of conical shape, and the seat reamed out to fit it, a light stroke on the top of the bail will settle the box to an air-tight joint in its seat. It is also designed to be easily withdrawn by the bail, by means of a chained hook or a hook attached to the rod.

To enable others to make and use my invention, I will proceed to describe its construction and operation, reference being had to the annexed drawings, making part of this specification, in which—

Figure 1 is a perspective view. Fig. 2 is a tubular wooden valve-box, and Fig. 3 is an iron band with bail attached.

$d\ d$, Fig. 3, are projections cast on the inside of the bail $b$. $e$ is a slightly splayed band attached to the bail as one piece. Fig. 2 is a tubular valve-box made of wooden pipe, cut in pieces of suitable length and turned, forming, first, a head-surface of three to four inches diameter for the seat of the valve. At the distance of half an inch down from the level of the top, a recess is turned, slightly tapering downward, forming a seat, $c$, for the band $e$. Below the band-recess the box is again shouldered down one-fourth of an inch, and from this point down to the end, three to four inches, is formed the conical tube $h$.

The construction and operation are as follows: The bail $b$, Fig. 3, is shaped in casting with more rotundity than that shown in the perspective view, Fig. 1. By rotundity is meant the outward-bent shape of the sides of the bail, thereby giving a greater distance between the catches $d\ d$ on the bail than is found in their normal condition on the box by one-fourth to three-eighths inch, thus admitting the box to pass between the catches on its passage into the band, so that the valve-box, having the two opposite sides flattened by splitting of a portion of the shoulder from the band-recess upward, will pass into the band between the two projections $d\ d$, Fig. 3, and admit of being driven tight upon the tapering seat $c$. The opposite sides of the bail are then bent inward toward each other, closing the projecting catches $d\ d$ firmly down upon the top of the wooden box, so that a stroke upon the top of the bail will move the box down and not loosen the band $e$. The end of the pipe which enters the bore of the lower end of the pump-stock is reamed to fit the taper of the valve-box tube. Let the box drop from the top of the pump to its seat, and a slight stroke from the end of the rod upon the bail will settle the tube to an air-tight joint in its seat, from which it may be again withdrawn by means of a hook, either upon a chain or the end of a rod, when a new valve is required, without the trouble of taking up the pump and pipe.

I claim—

1. The combination of the bail $b$, having interior catches $d\ d$, with the band $e$, as and for the purpose described.

2. The combination of the bail $b$, having interior catches $d\ d$, the band $e$, and the valve-box $h$, having seat $c$, all constructed and arranged as described.

JOHN TINGLEY. [L. S.]

Witnesses:
W. W. DOUGHERTY,
CHAS. G. BLATCHLEY.